Figure 3:
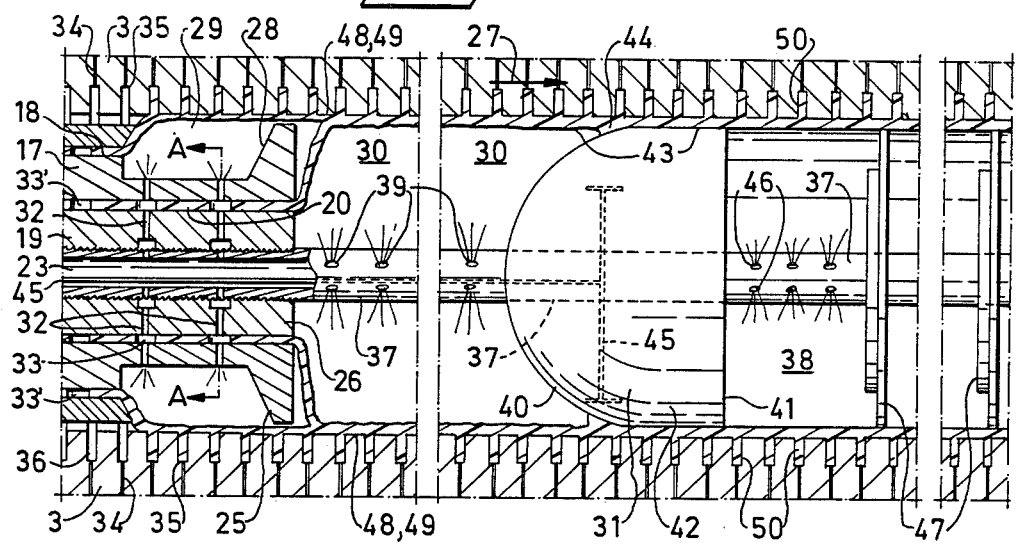

United States Patent [19]

Nordström

[11] Patent Number: 4,710,337
[45] Date of Patent: Dec. 1, 1987

[54] METHOD AND APPARATUS FOR CONTINUOUSLY EXTRUDING SINGLE-WALL PIPE OF PLASTICS OR OTHER MOULDABLE MATERIAL

[75] Inventor: Erik G. W. Nordström, Kovland, Sweden

[73] Assignee: Uponor AB, Sweden

[21] Appl. No.: 758,666

[22] PCT Filed: Nov. 14, 1984

[86] PCT No.: PCT/SE84/00389
§ 371 Date: Jul. 8, 1985
§ 102(e) Date: Jul. 8, 1985

[87] PCT Pub. No.: WO85/02144
PCT Pub. Date: May 23, 1985

[30] Foreign Application Priority Data

Nov. 15, 1983 [SE] Sweden ............... 8306284

[51] Int. Cl.⁴ ............................... B29C 47/30
[52] U.S. Cl. .................. 264/508; 156/244.14;
156/244.15; 156/500; 264/511; 264/514;
264/566; 264/568; 264/209.4; 264/284;
264/286; 425/504; 425/131.1; 425/326.1;
425/388; 425/396
[58] Field of Search ............... 264/506–508,
264/568, 173, 286, 511, 514, 566, 209.4, 284,
210.2; 425/133.1, 131.1, 326.1, 325, 377, 388,
396, 503, 504; 156/244.14, 244.15, 500

[56] References Cited

U.S. PATENT DOCUMENTS

| | | | |
|---|---|---|---|
| 3,758,354 | 9/1973 | Sakurai et al. | 156/244.14 |
| 3,994,644 | 11/1976 | Hegler et al. | 425/133.1 |
| 3,998,579 | 12/1976 | Nordstrom | 425/396 |
| 4,136,143 | 1/1979 | Lupke et al. | 264/508 |
| 4,199,314 | 4/1980 | Lupke et al. | 425/326.1 |
| 4,226,580 | 10/1980 | Lupke et al. | 264/508 |
| 4,305,703 | 12/1981 | Lupke et al. | 264/173 |
| 4,312,383 | 1/1982 | Kleykamp | 264/508 |
| 4,500,284 | 2/1985 | Lupke | 425/326.1 |
| 4,510,013 | 4/1985 | Lupke et al. | 425/393 |
| 4,534,923 | 8/1985 | Lupke | 264/508 |

FOREIGN PATENT DOCUMENTS

| | | |
|---|---|---|
| 2413879 | 9/1977 | Fed. Rep. of Germany . |
| 2397933 | 2/1979 | France . |
| 324653 | 4/1970 | Sweden . |
| 398073 | 12/1977 | Sweden . |
| 390530 | 8/1965 | Switzerland . |

Primary Examiner—Jeffery Thurlow
Attorney, Agent, or Firm—Silverman, Cass, Singer & Winburn, Ltd.

[57] ABSTRACT

The invention refers to a method and apparatus for manufacturing a single-wall pipe, tube or like conduit (9,44) having smooth inner surfaces and a mechanical-strength enhancing pattern of walls, flanges or ridges on the outer surface thereof, the conduit being made of plastics or like extrudable material.

35 Claims, 13 Drawing Figures

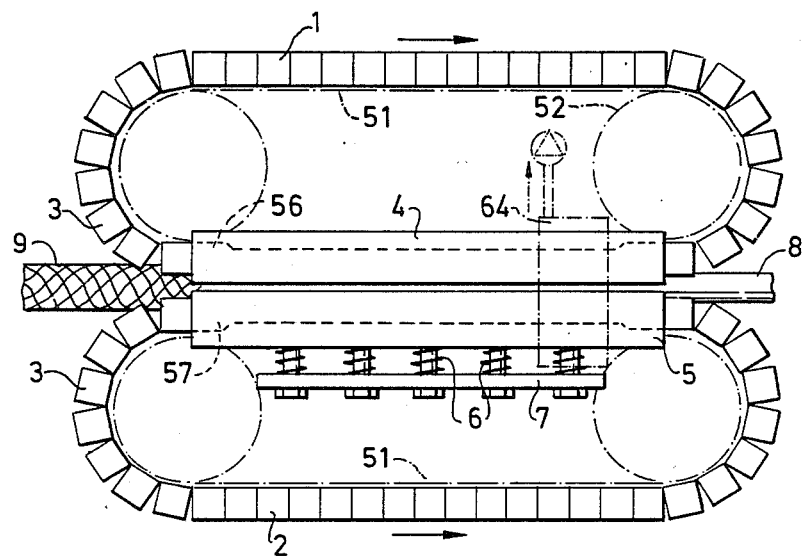
Fig_1
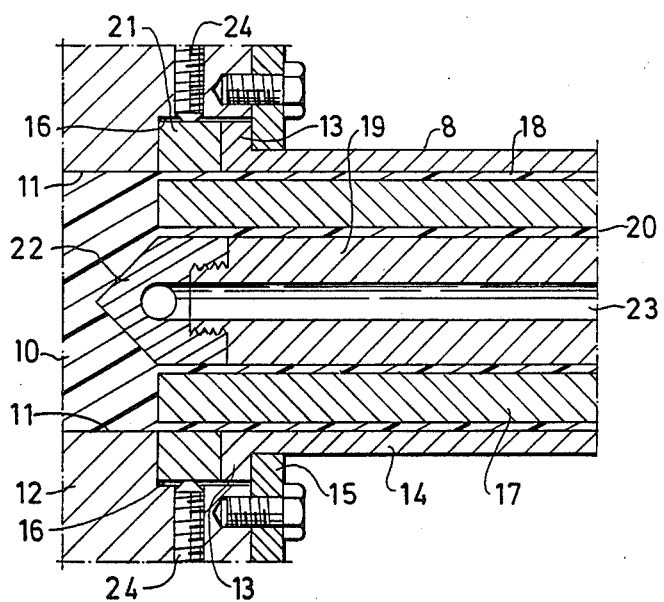
Fig_2

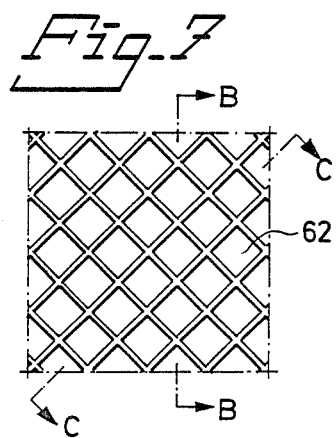
Fig_7
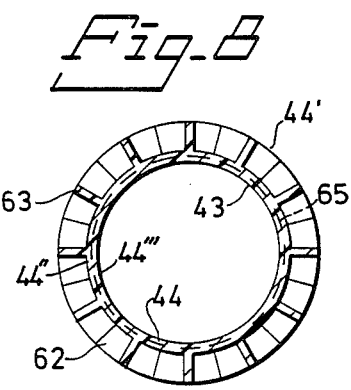
Fig_8
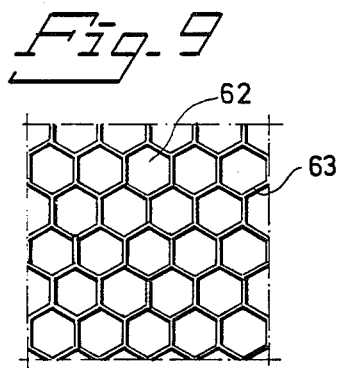
Fig_9
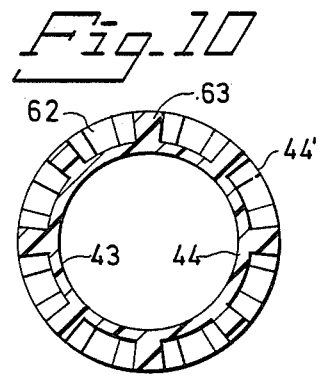
Fig_10
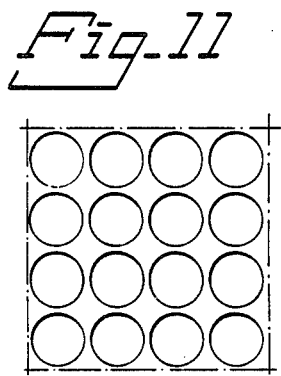
Fig_11
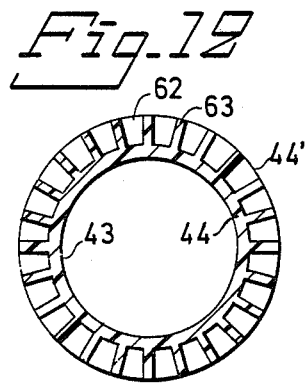
Fig_12

METHOD AND APPARATUS FOR CONTINUOUSLY EXTRUDING SINGLE-WALL PIPE OF PLASTICS OR OTHER MOULDABLE MATERIAL

The present invention relates to a single-wall pipe, tube or like conduit of a heat-mouldable or pressure-mouldable material, the conduit having smooth inner surfaces and a mechanical-strength enhancing pattern on the outer surface thereof. The invention further relates to a method and apparatus for manufacturing such conduits.

Such smooth inner-wall conduits are used in underground trenches as a means for protecting electric cables, in heat-exchangers etc. where the presence of irregularities, such as corrugations, on the inner surfaces of the conduits may create difficulties and/or in the cases where the conduit is subjected to relatively high mechanical streeses from externally of the conduit. A conduit manufactured in accordance with the method of the present invention can be used to advantage in those cases where a conventional corrugated or non-corrugated, smooth, conduit could otherwise be used, since a conduit produced in accordance with the invention for a similar throughflow area and external stresses, is cheaper to manufacture and lighter in weight, due to the fact that, inter alia, it incorporates less material per unit length.

Smooth inner-wall conduits having flanges or like protruberances on their outer surfaces are known to the art, inter alia manufactured by continuous extrusion. One method of manufacturing such conduits is described in Swedish Patent Application No. 7407555-7, according to which a conventional corrugated conduit is formed in a conventional manner by pressing a plasticized or molten material by means of air under positive or negative pressure against a moulding tool having the configuration desired of the moulded conduit, there being obtained a conduit which is patterned on both the inside and the outer side thereof. Further material is then introduced into the inside of the corrugated conduit, through an extrusion nozzle. This material forms a smooth sleeve whose outer surface bonds to the inner surface of the conduit. The conduit thus produced is not, however, a single-wall conduit, and the method by which the conduit is manufactured is encumbered with several disadvantages.

According to another method known for example from Swedish Pat. No. 7314295-2, material extruded by an extruder is fed to the space between two corrugated mould-jaw or die chains and is pressed into the corrugations of the dies with the aid of a conical mandril, the greatest external diameter of which determines the inner diameter of the conduit under manufacture. It is difficult with this method to produce single-wall conduits of good all-round quality. Because the material is pressed into the corrugation-forming or flange-forming cavities in the dies with the aid of an inflexible mechanical mandril, instead of with the aid of resilient prssurized air, it is difficult to fill all the cavities uniformly, so as to obtain fully formed corrugations or flanges. When the material is pressed into the aforesaid cavities, pockets of air readily form at the bottoms thereof, these pockets being empty of filling material. This is one of the reasons why incomplete or non-uniform flanges are formed. Furthermore, strong restrictions are placed on the height and form of the flanges, since it must be possible to release the moulded conduit from the moulding jawa or tools downstream of the moulding line in which the conduit is produced.

Light-weight conduits or pipes may be designed in the two principally different ways described above in order to achieve low weight and reasonable strength. However, different, in certain respects entirely different, products are obtained. In one case a single-wall pipe comprising outer, strengthening flanges is obtained while in the other case a double-wall pipe having hollow parts is obtained. It is obvious that the egg-shell design of the double-wall pipe makes the pipe less resistent to blows etc. than the flanged, single-wall pipe. Thus the single-wall pipe is especially suitable for pipes made of hard, brittle materials. The double-wall pipe comprising hollow parts is suitable for pipes made of soft and tough materials having good resistance to blows etc. even when very thin walls are used.

Another important difference between the flanged, single-wall pipe and the double-wall pipe having hollow parts, is that the insulating properties of the double-wall pipe are much better than those of the single-wall pipe. This is, of course, a great disadvantage if the pipes are meant for heat-exchanging purposes.

The object of the present invention is to provide a single-wall pipe, tube or like conduit or tubular element of the kind indicated above, the conduit being arranged so as to retain all the important advantages afforded by known conduits while offering new possibilities to adapt the material of the conduit to the use of the conduit. These objects are achieved by means of conduits formed in accordance with the principals of the invention. According to one embodiment of a conduit according to the invention a pipe extremely suitable for heat exchangers is provided, the pipe having an outer part made of a highly modified plastics material providing strength and good thermal conductivity and a thin inner part made of unmodified material providing resistance to chemically agressive substances.

Another object of the present invention is to provide a method for manufacturing conduits according to the present invention. However, single-wall conduits of known kind may be manufactured by means of the method. A further object is to provide a method, which solves the basic problems encountered in known methods. These objects are achieved by means of method steps occuring in accordance with the principals of the invention. The present invention also relates to apparatus for carrying out the method according to the invention. Apparatus for carrying out the invention is provided in accordance with the principals of the invention.

When practicing the method according to the invention conduits can be readily released from the relevant forming jaws or dies downstream of the forming line incorporating said apparatus for carrying out the invention.

Figure 4:
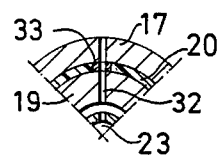
Figure 5:
Figure 6A:
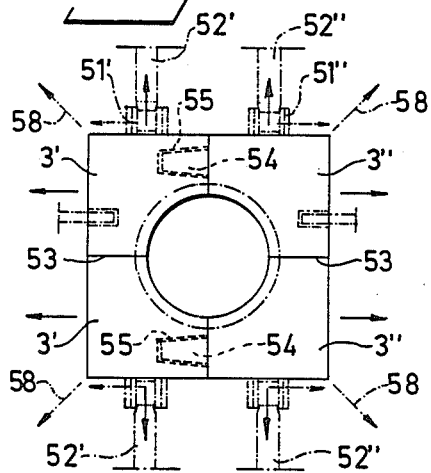

So that the features of the invention will be readily understood and the advantages afforded by the invention become more apparent, a number of embodiments of apparatus for carrying out the method according to the invention will now be described in more detail with reference to the accompanying drawings, in which FIG. 1 is a plan view of a schematically illustrated apparatus for carrying out the method according to the invention, FIG. 2 is a longidutinal sectional view of an extrusion nozzle according to the invention having an end connected to an extruder, FIG. 3 is a longitudinal sectional view according to FIG. 2 through a moulding line according to the invention, FIG. 4 illustrates a quarter of a sectional view taken on the line A—A in FIG. 3, FIG. 5 illustrates a spacer according to the invention, seen radially in, for example, FIGS. 3 and 4, FIG. 6a illustrates moulding jaws according to the invention seen in their direction of movement in the moulding line, the figure indicating the displacement of the jaws when releasing the formed conduit downstream of the moulding line.

Figure 6B:
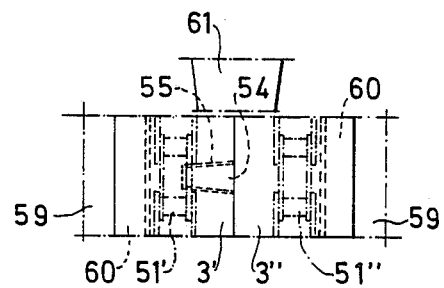

FIG. 6b illustrates the arrangement of FIG. 6a seen from above in FIG. 6a, where for the sake of clarity certain elements have been omitted, FIG. 7 is a schematic sectional view of the external cylindrical surface of a first embodiment of a conduit produced by a method according to the invention, FIG. 8 is a cross-sectional view of a conduit substantially according to FIG. 7, FIG. 9 is a schematic cross-sectional view of the external cylindrical surface of a second embodiment of a conduit produced in accordance with a method according to the invention, FIG. 10 is a cross-sectional view of a conduit substantially according to FIG. 9, FIG. 11 is a schematic cross-sectional view of the external surface of a third embodiment of a conduit produced by a method according to the invention, and FIG. 12 illustrates in cross-section a conduit substantially according to FIG. 11.

The apparatus illustrated in FIG. 1 includes two endless chains of mould-jaws 1,2 constructed of mould-jaw parts 3. The mould-jaw chains 1,2 are arranged to move through a given distance in close proximity to one another, while being guided in a firmly mounted channel-like guide rail 4 and channel-like guide rail 5, which is preferably arranged for limited axial movement and which is urged towards the guide rail 4 preferably by means of thrust springs 6 mounted between the guide rail 5 and a firmly mounted abutment means 7. Arranged in the region where the mould-jaw parts run together is an extrusion nozzle 8, which is connected to at least one extruder (not shown) arranged to accomodate and to feed highly fluid or plasticized material, such as a plastics material or like extrudable material. The moulded conduits are discharged from the illustrated apparatus at the location thereof where the mould-jaw parts move away from one another, as illustrated by the conduit 9.

FIG. 2 illustrates the end of the extrusion nozzle 8, which can be utilized in a one extruder process, where material 10 from the extruder is introduced into the nozzle through a passage 11 in a connector 12. The nozzle is secured in an axially extending recess 16 in the connector 12 via a flange ring 13 of an outer jacket 14. Arranged radially inwardly of the jacket 14 and in the proximity thereof is a first, outer mandril 17 or like device in the form of a tubular sleeve, where a first channel 18 of circular, substantially tubular cross-section for supplying material 10 is formed between the outer jacket 14 and the mandril 17. A second, inner mandril 19 or like device is provided inwardly of said first mandril 17, there being provided a second channel 20 of circular, tubular cross-section for supplying material 10.

The channels 18,20 connect with the extruder in said connector 12, where said outer jacket 14 is secured by means of a flange ring 21 in the recess 16 inwardly of the flange ring 13 of the outer jacket 14, and where the inner mandril 19 is provided with screw threads and is firmly screwed into an end piece 22 forming part of the outer mandril 17. Extending axially in the inner mandril 19 is a channel 23 intended, inter alia, for supplying pressure medium. As will be seen from the figure, setting screws 24, suitably four in number, are provided for displacing primarily the outer mandril 17 radially in the recess 16, to center said mandril.

FIG. 3 illustrates schematically the moulding line in which the material 10 is actually moulded to form a conduit. The ends 25,26 of the mandril 17,19 respectively protrude inwards at a part of the moulding line in which respective mould-jaw parts have just joined one another. The conduit to be moulded in the moulding line is intended to be produced in at least two stages. In accordance with the invention, when seen in the direction of movement of the material 10, identified by arrows 27 in FIG. 3, the nozzle includes a first separate location arranged before a second separate location, both for supplying material to the moulding line. In accordance with one preferred embodiment of the invention, the aforesaid first channel 18 supplies material at said first location to an annular space 29 formed between a tangentially extending recess 28 in connection with the end 25 of the outer mandril 17 and the mould-jaws 3. For the purpose of supplying material to said second location, the aforesaid second channel 20 discharges into a space 30 located at the ends 25,26 of the mandril 17,19, this space 30 being defined in the movement direction of said material by a smoothing mandril 31 located within the moulded conduit and the ends 25,26 of the mandril 17,19 facing the smoothing mandril 31, and is defined peripherally by the mould-jaw parts 3.

In order to fill all intended cavities, the material supplied to the first and the second locations is pressed against the mould-jaw parts 3, against mutually opposing surfaces in the moulding line, by means of devices which, according to one embodiment of the invention, comprise means for extracting air from the cavities of the mould-jaws, these cavities being intended to be filled with plasticized material 10, and means for supplying a pressure medium, preferably pressurized air or some other gas, to said cavities or spaces 29,30.

As illustrated, passages 32 are provided which extend from the channel 23 in the inner mandril 19, through the inner and the outer mandril substantially radially, and which discharge into the cavity 29. See in this respect FIGS. 3 and 4. In this embodiment, the passages 32 pass through the circular channel 20 in lead-throughs or bushes 33 arranged in the walls thereof, these bushes simultaneously forming spacers 33, by means of which the inner mandril 19 is held centrally guided in relation to the outer mandril 17. Suitably, additional spacers 33' are also provided.

The reference 34 identifies extremely fine passages for extracting air by suction, these passages 34 preferably opening into the bottom parts 35 of the mould cavities 36 of the jaws 3, these mould cavities forming the external surface of the conduit under manufacture. Means for producing a vacuum in the passages 34 will be described hereinafter. In FIG. 3 the reference 37 identifies a pipe or like membere which extends in the direction of movement of the material 10 from the end 26 of the inner mandril 19 and here forms a continuation of the pressure-medium supply channel 23. The pipe 37 extends axially through the cavity or space 30, and further through the smoothing mandril 31, forming a support therefor, and through a cooling space 38, downstream of the mandril 31, and continues through the apparatus in a manner hereinafter described. That section of the pipe 37 located in the cavity 30 is provided with holes or, nozzles 39 or the like through which pressure medium is supplied to the cavity 30 for forcing the material supplied at said second location towards the amterial supplied at the first location and towards the mutually facing surfaces of the mould jaws 3 in the moulding line. The aforesaid pressure medium also cools the moulded conduit from the inside.

The smoothing mandril 31, which defines the other end of the actual moulding line has a softly rounded convex ingoing end 40 which faces the mandril 17,19, and an outgoing end 41, and comprises between said ends 40,41 a substantially cylindrical portion 42, along which the material pressed against the mould-jaws is intended to run.

The smoothing mandril 31 includes means for heating the same to a temperature of such magnitude that the material on the inner surface 43 of the conduit 44 formed in the mould line is held in a molten or plasticized state to an extent such that the inner surface 43 will be substantially smoothed by sliding against the mandril 31. FIG. 3 illustrates electrical heating devices 45, in which the supply of electricity is effected through the pipe 34 and the channel 23.

Arranged in the colling space or, the cooling region 38, immediately downstream of the smoothing mandril 31 in the direction of movement of the conduit 44 are means for supplying a coolant to the inner surface 33 of the conduit 44, these means in the illustrated embodiment comprising nozzles or orifices 46, in the pipe 37, through which air or some other suitable gas is supplied and preferably held at a given pressure above atmospheric pressure or ambient pressure. Downstream of the cooling region 38 there is provided on the inside of the conduit 44 and preferably adjacent the pipe 37 one or more, preferably resilient sealing washers 47, which are arranged to abut the inner surface of the conduit and contribute to maintaining said over pressure, by obstructing the outflow of coolant.

The surfaces 48 of the mutally facing mould-jaws 3 in the moulding line have a configuration which corresponds to the outer surface 49 of the conduit 44 under manufacture, said configuration thus forming the recesses 36. In the embodiment illustrated in FIG. 3, a substantial part of the conduit thickness comprises radially directed, relatively thin walls 50, forming therebetween outwardly opening recesses, as hereinafter described, when seen in section in FIG. 3.

In accordance with one embodiment of an apparatus according to the invention, the mould-jaw parts 3, which are driven by chains 51 or the like as schematically illustrated in FIG. 1, are divided into two preferably symmetrical section 3', 3", best seen at FIG. 6a in the longitudinal direction of the mould line, said mould-jaw parts 3 being arranged to form a quadrisectional mould-jaw arrangement in the moulding line, The aforesaid chains 51 or like devices are driven in a known manner, by means of wheels or rollers 52 or the like (FIG. 1). According to the invention, there is provided at each jaw part 3 two chains 51', 51", wherewith a chain is arranged at each jaw section 3', 3", and wherewith a drive wheel 52', 52" or the like is provided for each chain 51', 51" as illustrated in FIG. 6a. The aforesaid chains 51', 51" and wheels 52', 52" are arranged so that at least one of said jaw parts 3', 3", preferably both of said parts, is, or are, capable of being moved to a limited extent towards and away from respective opposing jaws parts or section, substantially parallel with the axis of rotating of respective wheels 52', 52", said axis preferably being common to both of said wheels, and substantially parallel with the line 53 or the like along which the jaw sections 3 are intended to join one another in the moulding line. The reference 54, 55 identify guide means which may comprise, for example, at least one guide pin 54 arranged adjacent the one jaw section 3' and having square or elongated rectangular cross-section tapering from said jaw section 3', and a recess 55 arranged in the jaw section 3" and corresponding in form to the pin 54, said means 54, 55 being arranged to guide the jaw sections 3', 3", in said movement towards and away from one another.

Arranged in the vicinity of the part of the moulding line at which the conduit leaves said line is a lifting zone 56,57, FIG. 1, where the guide means 4,5, for the purpose of drawing the mouldjaws free from the formed conduit, are arranged so that the mould-jaw sections 3 are lifted from the conduit in a direction away from one another, at the same time as the sections 3', 3" of each jaw part 3 are moved away from oneanother, the lifting and displacing movements being coordinated with one another so that the four jaw sections 3', 3" encircling the conduit are displaced symmetrically in radial directions through substantially 90° in relation to one another, as shown schematically by the arrows 58 in FIG. 6a. Subsequent to releasing the conduit, the jaw parts 3 are intended to be swung away from said conduit and respective jaw sections 3', 3" are moved towards one another. The lifting of jaw parts 3 and the displacement of jaw sections 3', and 3" is arranged to be effected in a suitable manner, for example as schematically shown at FIG. 6b by means of guides 59 arranged to co-act with grooves 60 in said parts 3, and a means 61 having a wedge shape in the longitudinal direction of the moulding line and arranged to activate, for example, the chains 51', 51". The jaw sections 3', 3" can also be guided by means of guides or the like arranged to co-act with said sections.

The various embodiments of conduits illustrated in FIGS. 7-12 are intended for manufacture by means of the method according to the invention and are distinguished by the fact that external and closely adjacent arranged recesses 62 extend from the outer cylindrical surface 44' fo the conduit 44, substantially radially inwards and form a reinforcing system of external,preferably thin intermediate walls, flanges or ridges 63, which strengthen the conduit. In many instances it is preferably that the geometric extension of each recess, for example in the peripheral and longitudinal direction of the conduit, is of the same order of magnitude as the wall thickness of said conduit.

In the embodiments illustrated in FIGS. 7 and 8 the recesses 62 are of substantially square cross-section at right angles to the radial direction of the conduit. According to one embodiment, intermediate walls 63 have the form of helices, right-hand helices and left-hand helices. This embodiment is illustrated in the section taken on the line B—B in FIG. 7, said section extending circumferentially or longitudinally of the conduit, and in FIG. 8. According to another embodiment, the intermediate walls 63 extend circumferentially and longitudinally of the conduit, and a section taken along line C—C in FIG. 7 thus corresponding to the longidutinal or circumferential direction.

In the embodiments illustrated in FIGS. 9 and 10, when seen at right angles to the radius of the conduit, the recesses 62 have the crosssectional shape of a regular hexagon.

In the embodiments illustrated in FIGS. 11 and 12, the recesses 62 have a substantially circular cross-section when seen at right angles to a radius of the conduit.

Thus, in the case, inter alia, of thick-walled conduits produced by means of the method according to the invention, the intermediate walls 63 between the recesses 62 are arranged to contribute substantially towards strengthening the conduit with regard to stresses created by internal and external pressures. In this respect, the radial height of the intermediate walls forms a substantial part of the total wall thickness of the conduit, for example from one half to two-thirds said thickness.

For the purpose of producing conduits of the kind illustrated in FIGS. 7 and 8, the mould-jaw parts are designed so that continuous channels are formed in the moulding line, these channels extending in the form of left-hand and right-hand helices, or may extend longitudinally and circumferentially, thereby to provide a diamond-shaped network of intermediate walls.

For the purposes of producing conduits of the kind illustrated in in FIGS. 9-12, the mould-jaw parts 3 comprise outwardly projecting pegs which form the aforesaid recesses 62, the pegs having a crosssectional shape corresponding substantially to a regular hexagon or a circle respectively.

In order to facilitate removal of the conduit from the mould-jaws, the mould-jaw parts 3 may be designed so that the intermediate walls 63 taper outwardly slightly, and/or are provided with a given clearance or relief.

As beforementioned, in order to facilitate filling of the recesses in the mould-jaws with moulding compound or, in certain cases, to enable these cavities to be filled, the air present in primarily the bottoms of the recesses is evacuated therefrom by suction. To this end, there is provided a tunnel 64 or the like, as indicated in FIG. 1, in the vicinity of the entry to the moulding line. Air is extracted through the tunnel 64 in a suitable manner, so as to produce a tangible sub-pressure or vacuum. The mould-jaws are intended to pass through the tunnel 64, wherewith suitable sealing is effected between the walls of the tunnel and the mould-jaws.

Of course, as indiated earlier, more than one extruder may be provided. In such embodiments more than one extruder conduits according to the invention may be produced which conduits comprise more than one material. Thus a conduit may be produced which is of a composite structure and comprises two different concentric parts 44″, 44‴, (FIG. 8). For example, an outer part may be made of a material with certain properties, which material is provided from a first extruder through said first channel 18, and an inner part made of another material with certain other properties, which material is provided from a second extruder through said second channel 20. The invention is, of course, not restricted to an extruder nozzle according to FIG. 2 but the nozzle should be adapted to the extruder, the number of extruders etc. in a way which is obvious.

Thus, it will be understood that in the case of two extruders, one for a certain material and one for another material, the embodiments shown in FIGS. 7-12 comprise two materials with each material constituting a concentric part of the conduit. The distribution of these parts in the radial direction of the conduit may, of course vary e.g. between conduits for different purposes. Thus, embodiments are producable in which the conduit comprises an outer part made of one material and comprising said pattern of walls, flanges or ridges, the conduit further comprising an inner part made of another material. Such as embodiment is illustrated by means of the dashed circumferential line 65 in FIG. 8.

The working mode of the appartus according to the invention and the manner in which the method according to the invention is put into effect will be understood to a large extent from the aforegoing.

Thus, the material 10, in the form of a molten or plasticized plastics mass, is fed from the extruder or extruders to the moulding line, via the circular and separate channels 18, 20 formed in the extrusion nozzle 8. At the aforesaid first location, the material is supplied via the first channel, wherewith the amount of material supplied, the pressure under which said pressure medium is supplied through the passages 32, and the vacuum pressure exerting, through the fine passages 34, a suction force on the supplied material, are adapted so that the moulding-jaw recesses corresponding to said intermediate walls 63 are totally or partially filled at least to the bottom surfaces of said recesses. The material layer applied from the first channel 18 is preferably thinly applied, so as to ensure that the bottoms of respective recesses are filled satisfactorily. With certain configurations of recesses 62 and intermediate walls 63, air may be enclosed by the material 10 in the bottoms of the recesses of the mould-jaws, thereby making it practically impossible to fill the recesses. In this case air-evacuating passages 34 are activated. In other configurations, such as those for example where the intermediate walls extend helically around the conduit, the possibiiity of evacuating said air is incorporated in said configuration, thereby greatly reducing, or eliminating, the need to generate a suction force through passages 34. It will be evident herefrom that variances are available in which there is utilized solely pressure created through passages 32, or a suction force created through passages 34 or a combination thereof. Additional material 10 is supplied at said second location, via the second channel 20. This further material is supplied in such quantities that the grooves in the mould-jaws are totally filled and so that a conduit wall of desired thickness is formed between the intermediate wall 63, this conduit wall constituting the inner surface of the conduit and the bottom surface of the recesses 62. The newly applied material is pressed against the previously applied material and the mould-jaws by pressure medium supplied to the cavity 30 under a given overpressure through the nozzles 39. Preferably no vacuum pressures prevail in the passages 35 during this course of events. With regard to the pressure prevailing in the cavities 29 and 30, the pressure in cavity 30 is normally greater than the pressure in cavity 29.

For the purpose of smoothing the inner wall 43 of the conduit, the conduit is passed over the smoothing mandril 31, the diameter of the cylindrical part 42 of which corresponds substantially to the desired inner diameter of the conduit. Effective smoothing can be effected by heating the mandril 31 to a temperature which ensures that the material will be held molten or sufficiently plastic in regions adjacent the mandril.

In the event that excessive material is supplied in the aforesaid two stages, this excess material can be collected at the juncture between the input end 40 of the smoothing mandril 31 and the cylindrical part 42 thereof. The material thus collected can serve as a buffer. In order, among other things, to provide a certain degree of flexibility with regard to the amount of material supplied, by increasing or decreasing the thickness of the conduit wall, the mouldjaw parts in one chain 2 are arranged for movement towards and away from corresponding jaw parts in the second chain, under the action of a spring force by means of the devices 6,7.

The conduit is supplied with coolant through the nozzles 46 in the cooling station 38, in which there is preferably maintained a given overpressure. The sealing washers 47 contribute towards maintaining this overpressure.

In order to ensure reliable functioning, the mould-jaws 3 are cooled, for example, with freon gas. To this end, known means for cooling the mould-jaws are located within the region of at least a part of the moulding line and/or within the region where the smoothing mandril 31 is located and/or the immediately following region where coolant is supplied to the inner surface of the conduit. The mouldjaw parts 3 are suitable cooled in a manner to ensure that the material forming the pattern on the conduit wall and the external parts thereof are completely or partially solidified when the conduit moves along the smoothing mandril.

As previously mentioned, the mould-jaws must be freed from the moulded conduit. This is effected in the lifting zone 56,57 in substantially the manner described with reference to FIGS. 6a and 6b, i.e. the jaw sections 3', and 3" are displaced by means of the guide means 59, 60, 61, as indicated by the arrows 58 in FIG. 6a, or in some other suitable manner. Thus, in displacing the jaw sections, the recesses in respective sections 3', 3" are moved substantially radially in relation to the part of the conduit engaging said respective jaw section, i.e. one quarter of the periphery and herewith substantially in the direction in which the intermediate walls extend in the thickness direction of the conduit., In this respect, very little clearance, or substantially no clearance is required to prevent the configuration of intermediate walls from locking to respective jaw sections 3', 3" at the location where the conduit part engages said respective jaw section. When only two mould-jaw parts, mould-jaw halves are used, an extremely pronounced clearance or relief is required, in order to enable the mould-jaws to be drawn free.

Conduits can be manufactured in accordance with the invention at a high production rate, in which the conduit can be cooled more rapidly than a thick-wall conduit of homogenous wall thickness.

The invention also offers a new possibility to achieve certain properties at certain parts of the conduit by means of choosing different materials for different parts. Thus, according to the ivnention, conduits or pipes for heat exchangers are designed and produced, such conduit having an outer part, comprising the flanges for strengthening purposes, made of a highly modified plastics material providing strength and good thermal conductivity. The conduit also has a preferably thin, inner part made of substantially unmodified plastics material providing bood resistance to e.g. chemically aggressive substances. The highly modified material comprises fairly large amounts of e.g. mineral, such as clay, particles or metal, such as iron or aluminium, particles.

By means of different materials for different parts of the conduit of course a lot of new products for various applications may e designed and produced.

Of course single-wall conduits of known design may be produced according to the invention using one material or combinations of more than one material. Examples of such conduits are single-wall conduits having only circumferential ridges spaced along the conduit or having one or more helically running ridges, all ridges being equally turned.

The invention has been described in the aforegoing with reference to certain specific proposals and embodiments. It will be understood, however, that further variants and embodiments are conceivable without departing from the scope of the invention.

For example, the recesses 62 and intermediate walls 63 may have configurations different to those illustrated and described; for example each recess, as seen in FIGS. 7, 9 and 11, may have a cross-sectional shape corresponding to an equilateral triangle.

It will also be understood that the apparatus and method according to the invention may employ more than two mould-jaw chains, while the number of mould-jaw sections may be greater than four, even though two chains and four jaw sections are to be preferred for machine-technical reasons.

Furthermore, the geometry of the conduit with regard to the height of the intermediate wall 63, i.e. the depth of the recesses 62, in relation to the total wall thicknesss of the conduit and the residual material thickness between the bottom surfaces of the recesses and the inner surface of the conduit can vary within wide limits in dependence upon the desired mechanical strength. The extension of the recess across the cylindrical surface of the conduit and the extension in relation to the total wall thickness may also be varied within wide limits.

The flexibility of the conduit can be influenced by the configuration of the intermediate walls. When the intermediate walls have the form of longitudinally extending continuous walls, the conduit is resistant to bending.

It should be mentioned that the method and apparatus according to the invention can also be used for manufacturing conduits not provided, inter alia, with pronounced recesses but with which, when employing conventional manufacturing techniques, difficulties are experienced, or may be expected to occur when, inter alia, separating the mould-jaw parts from the conduit.

In accordance with one preferred embodiment of the invention, the flange ring 21 and end piece 22 are joined with the outer mandril 17 by means of substantially radially extending, spoke-like connecting and spacing elements, which are not included in the sectional view of FIG. 2, these connecting and spacing elements ensuring that the outer mandril 17 is firmly centered in relation to the flange ring 21 and the end piece 22. In accordance with a further preferred embodiment, the spacing elements 33, 33' are designed to offer a low resistance to the material 10 passing said elements 33, 33'. In this respect, the spacing elements are streamlined in the flow direction of the material 10, and exhibit sharp end portions, so that the material can be divided at and sealed-off downstream of the elements 33, while being subjected to but low resistance. similar spacing elements 33' are also provided in the vicinity of the forward ends of the mandril 17 and 19, as seen in the flow direction of the material, even where lead-throughs for pressure medium are not required. In this case, spacing elements 33' are suitably arranged in both the passage 18 and the passage 20, both between the outer jacket 14 and the outer mandril 17, and between the outer mandril and the inner mandril 19, as illustrated in FIG. 3. This enables the outer mandril 17 to be well centered in relation to the outer jacket 14 and the two mandrils 17, 19 to be well centered in relation to each other.

In order to produce a conduit of uniform wall thickness, the speed at which the mould-jaw chains are driven is suitable adapted to the quantity of material fed from the extruder per unit of time. When too much material is fed from the extruder, the mould-jaw chains are moved outwardly, provided that said chains are displaceably arranged in substantially the radial direction of the conduit under manufacture, as illustrated in FIG. 1 by means of the spring-loaded guide rail 5. This provides an indication that excessive quantities of material is being supplied, this excess material being compensated for by increasing the speed of the mould-jaw chains.

Naturally, the amount of material discharged from the extruder can be controlled in a corresponding manner.

Above it has been stated that more than one extruder may be used. In the examples given above two stages have been used for producing conduits. However, conduits may be formed in more than two stages by means of a method according to the invention. This may be achieved by providing a third location at which material is supplied e.g. via a third channel which may be obtained by means of a further mandril. In this way conduits may be produced which comprise more than two different concentric parts. The composition of the conduit may be such that one part is made of a certain material and all the other parts are made of another material. Several combinations are possible, e.g. if the two layers are not weldable or adhered to each other this can be hleped by having a third nozzle beteween the first and the second from which a glue-type of plastics is extruded between the layers. Conduits may of course also be produced which are made of only one material but which are produced in more than two stages.

The invention is not restricted to the aforedescribed variants and embodiments, and modifications can be made within the scope of the accompanying claims.

I claim:

1. In a method of manufacturing a single-wall ribbed conduit having a smooth inner surface from a thermoplastic extrudable material wherein said material is fed from at least one extruder through an extruder nozzle and into a molding apparatus comprising mould-jaw chains which move adjacent one another along a molding line and include mould-jaw parts whose mutually opposing surfaces in the molding line have a form corresponding to a desired form of an outer surface of the conduit under manufacture, and wherein said material is pressed agains the surfaces of the mould-jaw along at least a part of the molding line and wherein the mould-jaw chain are caused to move away from one another subsequent to passing the moulding line, the mould-jaw parts therewith releasing their engagement with the outer surface of the conduit under manufacture, the improvement comprising:

producing the conduit under manufacture in at least two stages by supplying said extrudable material to said moulding line to at least two separate locations, a first location and a second location positioned after the first location in the direction of conduit movement;

supplying said material to said first location from a first channel of circular cross-section and forcing such material against the mould-jaw part by a gaseous medium under pressure and/or suction-drawing such material against said mould-jaw part by a vacuum exerted through passages in said mould-jaw parts, while adjusting the quantity of material supplied and the pressure and/or vacuum at said first location so that grooves in the mould-jaw parts, corresponding to outwardly protruding portions of the conduit under manufacture, are filled with said material at least to the bottom thereof; and supplying additional extrudable material to said second location from a second channel of circular cross-section formed between an external first mandril and an internal second mandril and discharging such additional material into a cavity located between an input end of a smoothing mandril and ends of said first and second mandrils facing said smoothing mandril, and forcing such additional material against the material delivered to said first location by a pressurized gaseous medium fed to said cavity.

2. In a method as defined in claim 1 wherein said supplying of extrudable material to said first and second channel involves feeding different extrudable material from at least two extruders to each respective channel whereby the conduit under manufacture is provided with a composite structure and include two different concentric portions, each composed of a different material.

3. In a method as defined in claim 1 including guiding said internal second mandril in relation to said external first mandril at least in the region where the ends of said mandrils face said smoothing mandril with the aid of spacing elements arranged in said second chanel.

4. In a method as defined in claim 3 including providing lead-throughs through said spacing elements for passages which extend transversely through said second channel and through which a pressurized medium and/or vacuum is supplied to said first location, said passage extending from a supply of pressurized medium and/or a vacuum to a supply channel extending axally within said inner mandril.

5. In a method as defined in claim 3 wherein said guiding of said external first mandril in relation to an outer jacket with which said first mandril forms said first channel, occurs with the aid of spacing elements arranged in said first channel.

6. In a method as defined in claim 2 including providing said smoothing mandril with a softly rounded convex shape at an input end thereof, and maintaining said smoothing mandril at an adequately high temperature so that an inner surface of the conduit under manufacture is smoothed by pressure of said smoothing mandril against said inner surface, and cooling the mould-jaws so that the material from which the pattern and surface parts of the conduit wall are formed, is at least partially solidified when the conduit under manufacture moves along said smoothing mandril.

7. In a method as defined in claim 2 wherein at least two mould-jaw chains are moved parallel with one another along the moulding line during the formation of the conduit under manufacture, said mould-jaw chains including mould-jaw parts symetrically divided in the longitudinal direction of the moulding line such that each of said mould-jaw parts includes two mould-jaw sections arranged for movement toward and away form one another and arranged to move adjacent one another along the moulding line to form said mould-jaw parts; and substantially at the same time as the mould-jaw parts are moved apart after passing the moulding line, each of said mould-jaw sections of a respective mould-jaw part is moved in a direction away from another mould-jaw section so that each mould-jaw section is displaced substantially radially outwardly in relation to a conduit portion formed in the moulding line by said mould-jaw sections.

8. In a method as defined in claim 7 wherein there is provided two mould-jaw chains and in which each mould-jaw part includes two mould-jaw section.

9. In a method as defined in claim 7 wherein each longitudinal row of mould-jaw sections of the mould-jaw chains is driven by a drive chain arranged adjacent said mould-jaw sections.

10. In a method as defined in claim 9 wherein said drive chains for each mould-jaw section of the mould-jaw parts extend around a common rotational axis at least in the vicinity of the zone where the mould-jaw sections move away from one another.

11. In a method as defined in claim 1 wherein the inner surface of the mould-jaw parts are designed to impart to the outer surface of the conduit under manfuacture a pattern comprising rib-like structures which extend outwardly from the outer cylindrical boundry of said conduit and which form a network of relatively thin intermediate walls, the height of said rib-like structures constituting a substantial part of the total wall thickness of said condut, 12. In a method as defined in claim 11 wherein said pattern defines a diamond-shaped network, said network being formed in the moulding line by continuous grooves fromed in the mould-jaw parts and extending in left-hand and right-hand helices.

13. In a method as defined in claim 11 wherein said pattern defines a diamond-shaped network, said network being formed in the moulding line by continuous grooves formed in the mould-jaw parts and extending in the longitudinal direction and the periferal direction of the moulding line.

14. In a method as defined in claim 11 wherein said pattern defines circular cross-sectional structures, said circular structures being formed by substantially radially extending pegs of corresponding cross-sections arranged on the mould jaw parts.

15. In a method as defined in claim 11 wherein said pattern defines a regular hexagon cross-sectional structures said hexagon structures being formed by substantially radial extending pegs of corresponding cross-sections arranged on the mould-jaw parts.

16. In an apparatus for producing a single-wall ribbed conduit having a smooth inner surface from an extrudable plastics material, said apparatus comprising at least one extruder; a plurality of complementary mould-jaws having mutually facing surfaces with recesses therein corresponding to a desired form of outer surface of the conduit being produced, said mould-jaws being arranged for transportation in an endless chain along a select transport distance of said chain to define a moulding line; an extrusion nozzle coupled with said extruder for supplying moulten plastics material to said moulding line; pressure means for urging the moulten plastics material against said mutually facing surfaces of the mould-jaws along at least a part of the moulding line; cooling means for cooling the conduit being produced; separating means for moving the mould-jaws apart subsequent to passage past said moulding line, said mould-jaws being arranged to release their engagement with the outer surface of the conduit being produced; the improvement comprising:

at least two stages for supplying material to the moulding line at least at two mutually separated locations, a first location and a second location positioned after the first location in the direction of material movement along said moulding line;

adjustment means for regulating the amount of material supplied and the pressure and/or vacuum applied at said first location in a manner such that the recesses in the mould-jaws are filled with said material at least to their respective bottom portions;

supply means for providing a pressurized gaseous medium to said first and second location to press supplied material against the mould-jaws and for providing a vacuum to at least said first location to draw supplied material against the mould-jaws;

passages in said mould-jaws at the bottom of the grooves of each respective recesses connected to said vacuum supply means at least in the vicinity of said first location;

a first channel having a circular cross-section positioned to supply material to said first location, said first channel opening into an annular first space formed between an outer first mandril and the mould-jaws and coupled with said supply means for pressurized gaseous medium and vacuum; and a second channel having a circular cross-section positioned to supply material to said second location, said second channel being formed between said outer said first mandril and an inner second mandril, said second channel opening into an annular second space defined, when seen in the direction of material movement, by respective end of said first and second mandrils facing a smoothing mandril located past said second channel and an input end of said smoothing mandril; and means for interconnecting said supply means for pressurized gaseous medium to said second space to provide said pressurized gaseous medium to such second space to press the material supplied at the second location against the material supplied at the first location.

17. In an apparatus as defined in claim 16 wherein said smoothing mandril is provided with a softly rounded convex shape at an input end thereof.

18. In an apparatus as defined in 16 wherein spacing elements are arranged in said second channel in the region of the ends of said first and second mandrils facing the smoothing mandril for guiding said second inner mandril in relation to said first outer mandril.

19. In an apparatus as defined in claim 18 wherein said spacing elements form lead-through extending through walls of said second channel for accomodating passages supplying pressurized gaseous medium to said first location, said passages extending transversely from a pressurized gaseous medium supply channel extending axally within the first mandril.

20. In an apparatus as defined in claim 16 wherein spacing elements are also provided in said first channel for guiding said first mandril in relation to an outer sleeve, said outer sleeve forming, together with said first mandril, said first channel.

21. In an apparatus as defined in claim 16 wherein the smoothing mandril includes means for heating said mandril to a temperature such that the material on the inner surface of the conduit formed in said moulding line is held in a plasticized state to an extent such that the inner surface thereof can be substantially smoothened by sliding action with the smoothing mandril.

22. In an apparatus as defined in claim 18 wherein the spacing elements are arranged to offer relatively low resistance to the material passing said spacing elements, said spacing elements being streamlined in the flow direction of material and having relatively sharp end portions such that the material is divided and sealed off subsequent to passing said elements under low resistance.

23. In an apparatus as defined in claim 16 wherein said moulding line includes by at least two mutually parallel mould-jaw chains, said mould-jaw chains including mould-jaw parts symetrically divided in the longitudinal direction of the moulding line such that each mould-jaw part includes at least two mould-jaw sections which are arranged for movement toward and away from one another and to move adjacent one another to form said mould-jaw parts in said moulding line.

24. In an apparatus as defined in claim 23 wherein means co-acting with the mould-jaw chains are provided whereby each mould-jaw section of the mould-jaw parts is arranged to move in a direction away from another mould-jaw section subsequent to passing said moulding line substantially at the same time as the mould-jaw parts are moved apart, so that each mould-jaw section is moved substantially radially outwards in relation to the conduit portion formed in the moulding line by said mould-jaw sections.

25. In an apparatus as defined in claim 23 wherein two mould-jaw chains are provided and each mould-jaw part includes two mould-jaw sections.

26. In an apparatus as defined in claim 23 wherein each longitudinal row of mould-jaw sections of said mould-jaw chains is provided with a drive chain for driving said chain of mould-jaws.

27. In an apparatus as defined in claim 26 wherein the drive chains for the mould-jaw sections of each mould-jaw part extend around a common rotational axis at least in the vicinity of the zone where said mould-jaw section are arranged to move away from one another and a wedge-shaped means is positioned at said zone for moving said sections away from one another by acting against the drive chains.

28. In an apparatus as defined in claim 27 wherein said wedge-shaped means comprises guide rails co-acting with said mould-jaw sections.

29. In an apparatus as defined in claim 23 wherein said mould-jaw sections of each mould-jaw part are guided relative to one another when moved towards or away from each other by at least one guide pin arranged adjacent the one mould-jaw section, said pin having a narrowing and generally rectangular cross-section, with a corresponding recess in an adjacent mould-jaw section.

30. In an apparatus as defined in claim 16 wherein the inner surface of the mould-jaw parts are designed such as to impart to the outer surface of the conduit under manufacture, a pattern comprising rib-like structures which extend substantially radially outwards from the outer cylindrical boundry of such conduit and which form therebetween a system of relatively thin intermediate walls, where the height of said rib-like structures corresponds to a substantial part of the wall thickness of said conduit.

31. In an apparatus as defined in claim 30 wherein said mould-jaw parts include continuous grooves for forming said intermediate walls, said grooves being arranged to form a left-hand and right-hand helices in the direction of the moulding line and thereby define a diamond-shaped network of intermediate walls on said conduit.

32. In an apparatus as defined in claim 30 wherein said mould-jaw parts include continuous grooves for forming said intermediate walls, said grooves being arranged to extend in the longitudinal direction and the peripheral direction of the moulding line and thereby define a diamond-shaped network of intermediate outer walls in said conduit.

33. In an apparatus as defined in claim 30 wherein said mould-jaw parts include outwardly projecting pegs for forming said rib-like structures, said pegs having a cross-sectional shape of generally circular configuration.

34. In an apparatus as defined in claim 30 wherein said mould-jaw parts include outwardly projecting pegs for forming said rib-like structures, said pegs having a cross-sectional shape corresponding substantially to a regular hexagon configuration.

35. Apparatus for producing a single-wall ribbed conduit having a smooth inner surface from an extrudable plastics material, comprising:

A. a pair of endless chains of complementary mould-jaws formed of a plurality of mould-jaw parts having interior moulding surfaces, said chains being arranged to move through a given distance in close proximity to one another, said distance defining a moulding line;

B. at least one extrusion nozzle positioned at an input end of said moulding line, sid extrusion nozzle being operationally coupled to at least one extruder providing a stream of extrudable material to said nozzle;

C. a first, outer mandril positioned within said nozzle so as to define a first channel of circular cross-section for guiding extrudable material to a first location in said moulding line, and a second, inner mandril positioned inwardly of said first mandril so as to define a second channel of circular cross-section for guiding extrudable material to a second location in said moulding line, said second location being spaced from sid first location and positioned after the first location in the direction of material movement;

said interior moulding surfaces of each mould-jaw part being provided with a plurality of recesses defining a ribbed outer surface of the conduit being produced, each of said recesses having a relatively fine passage at a bottom thereof for passage of a gaseous medium therethrough;

D. vacuum means operationally coupled at said first location with the interior moulding surfaces of said mouldjaw parts to extract gaseous medium from at least the bottom of said recesses in said mould-jaw parts and draw extrudable material to at least the bottom of each recess;

E. pressure means operationally coupled at said first location with the interior moulding surface of said mouldjaw parts to provide a pressurized fluid media to a space between said moulding surfaces to force material at said first location at least partially into the recesses in the mould-jaw parts;

F. a smooothing mandril having a rounded convex surface facing said first and second mandrils and a cylindrical portion joined with said rounded surface, said cylindrical portion being located in close proximity to the moulding surfaces of opposing mould-jaw parts, said smoothing mandril being positioned within said said second location and spaced from said second channel; and G. fluid-coupling means interconnecting said pressure means with said second locatin at least at the space between said second channel and said smoothing mandril to provide a pressurized fluid medium to said space and force material at said second location against the material supplied at the first location.

* * * * *